United States Patent [19]
Köhler

[11] Patent Number: 5,476,704
[45] Date of Patent: Dec. 19, 1995

[54] PLASTIC-COMPOSITE PROFILED GIRDER, IN PARTICULAR A WING SPAR FOR AIRCRAFT AND FOR WIND-TURBINE ROTORS

[75] Inventor: Dieter Köhler, Wiener Neustadt, Austria

[73] Assignee: Hoac-Austria Flugzeugwerk Wr.Neustadt Gesellschaft m.b.H., Neustadt, Austria

[21] Appl. No.: 193,165

[22] PCT Filed: Jun. 30, 1993

[86] PCT No.: PCT/AT93/00108

§ 371 Date: Feb. 10, 1994

§ 102(e) Date: Feb. 10, 1994

[87] PCT Pub. No.: WO/94/01271

PCT Pub. Date: Jan. 20, 1994

[30] Foreign Application Priority Data

Jul. 1, 1992 [AT] Austria ................. 1344/92

[51] Int. Cl.⁶ ................. B29D 31/00; E04C 3/28
[52] U.S. Cl. ................. 428/119; 52/731.1; 52/729.2; 52/735.1; 244/119; 244/120; 244/123; 244/131; 428/120; 428/220; 428/245; 428/251; 428/252; 428/253; 428/261
[58] Field of Search ................. 428/119, 120, 428/220, 245, 251, 252, 253, 261, 116, 73; 244/119, 123, 120, 131; 52/734, 731.1, 729

[56] References Cited

U.S. PATENT DOCUMENTS

| | | | |
|---|---|---|---|
| 2,779,388 | 1/1957 | Quoss | 154/30 |
| 3,374,132 | 3/1968 | Boggs | 156/171 |
| 3,455,765 | 7/1969 | Meyer et al. | 156/431 |
| 4,177,306 | 12/1979 | Schulz | 428/119 |
| 4,198,013 | 4/1980 | Brault | 428/119 |
| 4,281,497 | 8/1981 | Luotonen et al. | 52/730 |
| 4,640,065 | 2/1987 | Harris et al. | 52/204 |
| 4,662,587 | 5/1987 | Whitener | 428/119 |
| 4,811,540 | 3/1989 | Kallies | 428/119 |
| 5,094,798 | 3/1992 | Hewitt | 264/511 |

FOREIGN PATENT DOCUMENTS

| | | | |
|---|---|---|---|
| 2102105 | 4/1972 | France . | |
| 2432589 | 2/1980 | France . | |
| 1629811 | 1/1971 | Germany . | |
| 1504717 | 11/1971 | Germany . | |
| 2718002 | 10/1978 | Germany . | |
| 3639743 | 5/1988 | Germany . | |
| 592275 | 9/1947 | United Kingdom | 428/119 |
| 850785 | 10/1960 | United Kingdom . | |
| 1029129 | 5/1966 | United Kingdom . | |
| 1133501 | 11/1968 | United Kingdom . | |
| 1176794 | 1/1970 | United Kingdom . | |
| WO85/05071 | 11/1985 | WIPO . | |

OTHER PUBLICATIONS

Roberson, D. et al, "Koolstofvezelpultrusies", Werktuigbouw, Bd. 32, No. 4, Apr. 1977, pp. 199–294.

Primary Examiner—Nasser Ahmad
Attorney, Agent, or Firm—Jacobson, Price, Holman & Stern

[57] ABSTRACT

Synthetic resin composite profile, in particular wing spar for aircraft construction, comprising at least two flanges (1) provided with adhesive bonding flanges and at least one web (2) interconnecting the flanges (1) and inserted into the adhesive bonded flanges, the flanges (1) being constructed of resin impregnated rovings and the web (2) of resin impregnated woven or non-woven fabrics and the flanges (1) and the web (2) being adhesively interconnected. The flanges (1) are pultruded, the web (2) being inserted into the adhesive bonding flanges of both flanges (1) and fixed therein by means of a thixotropic adhesive (4). This manner of construction ensures that the full flange adhesive bonding width is retained even if the component height should change.

10 Claims, 2 Drawing Sheets

PLASTIC-COMPOSITE PROFILED GIRDER, IN PARTICULAR A WING SPAR FOR AIRCRAFT AND FOR WIND-TURBINE ROTORS

DESCRIPTION

The invention relates to a synthetic resin composite profile, in particular a wing spar for aircraft construction and for wind-power rotors.

BACKGROUND OF THE INVENTION

As in many other areas of technology, plastics components are used increasingly also in aircraft construction. Small aircraft such as gliders, motorised gliders or light motorised aircraft are nowadays built almost exclusively of fibre reinforced plastics. This applies likewise for all load carrying structures in this context such as in particular the wings. The wing is constructed of a wing shell which provides the profile, i.e. the wing profile which generates the lift and which primarily accommodates torsional load, as Well as at least one wing spar. The spar absorbs the bending moment generated by the lift. The spars are designed as fibre reinforced composites and are usually designed in the form of box spars or I-spars.

Those parts of the spars which absorb the tensile and compressive forces are denoted as flanges and are essentially horizontally orientated. The substantially vertically orientated connection between at least two flanges one above the other are denoted as a web. At present the flanges are manufactured from so-called rovings, i.e. non-woven resin impregnated mineral fibres and filaments, whereas the webs are formed of resin impregnated fibres, interconnected to form woven or nonwoven fabrics. For reinforcing against bulging, the webs are generally constructed as sandwich components.

For the manufacture of plastics profiles specifically for use as aircraft spars, two modes of construction are at present usually employed of which the one resides in that the flanges are built up by manual layering in moulds or directly in the wing shell by the superimposition of resin impregnated rovings. Thereafter, by means of at least one additional mould, at least one web as well as a bonding flange is built up between the web and the flange. When adhesively bonding together, the wing upper and lower shell an interconnection is also brought about of the upper and lower flanges of the spar by bonding together in the web the web bonding flange.

The second method provides that the flanges are likewise built up in moulds by a manual layering procedure. Thereafter, they and the web base panels are assembled, preferably around moulds, and the interconnection of the individual components is brought about by applying thereon or winding there around diagonally positioned fabrics.

SUMMARY OF THE INVENTION

Both conventional modes of construction are highly labour intensive and time consuming and also subject to substantial quality fluctuations. Accordingly, it was an object of the present invention to provide a plastics composite profile which avoids the drawbacks of the conventional composite profiles and in addition also permits the construction of profiles, in particular wing spars with a tapering cross-section and constructional height. In addition it is also intended to provide an improved manufacture of profiles of essentially constant constructional height.

A further object resides in the provision of improved constructions for synthetic resin composite profiles, in particular wing spars for aircraft construction which for an at least equal stability and strengths provide an improved long-term strength and can be manufactured more easily and more rapidly and with improved quality.

These objects are attained in accordance with the present invention. This construction ensures that even in the event of changing constructional heights the full width of adhesive flange bonding is maintained. In this composite profile a web is manufactured from resin impregnated woven or non-woven fabrics which is adhesively bonded to the flange, the flange being manufactured by machine by pultrusion with the desired cross-section, preferably with a moulded-on adhesive bonding flange, being cut to size to the desired length by cutting means which are moved along with the product, in a single processing step. Thus in order to produce the flange a multitude of fibres or filaments are passed through a synthetic resin bath by conventional guide means and are subsequently brought into the desired cross-sectional configuration for the flange. Thereafter, resin impregnated rovings are drawn through a heated mould wherein the component is given the desired cross-sectional configuration and which it leaves in a cured state. Preferably, during the pultrusion which represents a form of extrusion by drawing action the adhesive bonding flanges are simultaneously moulded on. Thereafter, the flanges are cut to the desired length, the cutting means such as for example conventional saws or water jet or laser cutting devices are guided along for purposes of continuous production. The flange is accordingly to be manufactured by machine in a single operation, which due to the exactly parallel fibre orientation and the continuous transition to the adhesive bonding flange brought about by the machine operation results in an improved quality of the flanges. In addition, the transitions to the adhesion flange can be better controlled. It is possible to manufacture continuously and rapidly many flanges of uniform quality without having to use wing shells as moulds or having to depend on the becoming available of moulds for the moulding there against of premanufactured individual components.

The constructional height which changes from one end of the profile to the other can be attained by the use of a web the width of which changes continuously. Thus is it possible for example to adapt a wing spar to a constructional height of the wing which changes along the wing span. An adaptation of the profile to a bending load which changes along its length, for example, in the case of aircraft spars, the bending load which reduces towards the wing tip, is attained by a reduction of the flange cross-section to match the loading. This reduction is brought about in that the flanges after the pultrusion are machined, preferably by sawing, water jet or laser cutting so that the cross-section diminishes continuously from one end to the other. Generally in this context the adhesive bonding flanges are not shortened. As compared with traditional methods the construction method according to the invention does not involve any increased weight of the profiles.

The quality, in particular of highly stressed components, can be further improved in the transitional region to the adhesive bonding flange of the web whilst maintaining the simple and rapid manufacturing method in that during the pultrusion diagonal strips of woven or non-woven fabric are additionally worked into the web. These will then take care of the required thrust resistance of the adhesive bonding flanges.

After a thixotropic adhesive has been introduced between the adhesive bonding flanges, a premanufactured web is inserted, and the assembly is cured. The production time required for the manufacture is further decreased substantially because the flange and the web are: premanufactured and need merely be assembled by means of the thixotropic adhesive. The web may be premanufactured as a plane panel which further contributes to the reduction of the production time, since it is no longer necessary to apply the load-bearing web covering during the assembly onto the web and flange profile.

The manufacture of profiles of uniform structural height is carried out in that at least one flange and the web are manufactured as a profile in one piece by machine action by pultrusion with the desired cross-section and by trimming to size, preferably by guided along cuffing means, to the desired length in a single process step. Such profiles do not have any connecting regions between individual structural elements which may come apart when subjected to load.

After the pultrusion, it is also possible to subject the flanges to machining, e.g. by sawing, water jet or laser cutting, so that the cross-section reduces continuously from one end to the other. In this manner, it is for example possible to adapt a wing spar of continuous structural height to the bending load which diminishes towards the wing tip.

The pultrusion of the flanges improves the quality in particular at the transitions to the adhesive bonding flange. The latter permits the insertion of a premanufactured web so that even the production time required for the assembly is reduced substantially and the process steps are simplified. Eventually this is also reflected in the price of the finished component.

Due to the fact that diagonal strips of woven or non-woven fabric worked into the flanges extend into the lateral parts of the adhesive bonding flanges, an improved thrust resistance of the adhesive bonding flanges is attained in particular for highly stressed components. An embodiment devoid of these reinforcements is unable to tolerate the thrust forces which arise.

Due to the fact that at least one web is composed of a base panel preferably of foam material or honeycomb panel material and cover layers provided on both sides, made of woven or knitted fabric and that the superimposed number thereof varies as a function of the longitudinal position on the web, preferably decreasing progressively from one of the narrow sides to the other., it is possible to influence on the one hand the weight distribution and the bending performance along the length of the web and thereby also of the completed profile.

The best strengths are attained by using epoxy resin as the adhesive as well as for the resin for manufacturing the flanges and webs. Epoxy resin is at present the only material permitted for aircraft construction, however, for other fields of application these measures can be used.

Glass or carbon fibres are preferably used as fibres for the manufacture of the rovings, and woven and non-woven fabric, optionally also aramide fibres. Glass fibres offer the advantage that they are cheap whereas the lighter carbon fibres have a higher price. The likewise expensive aramide fibres have high tensile strength but at present still yield poor compressive force values.

In the case of profiles for which a change in constructional height is not required the flanges and the web can be designed in one piece and may be jointly pultruded. From this result particularly stable profiles which in particular are unlikely to suffer a coming loose of connections between individual parts and can be manufactured particularly simply.

In such profiles the web may be reinforced by an additional stiffening means, preferably a sandwich panel adhesively bonded on. This protects the web against bulging.

Both embodiments of the plastics profiles, in order to be adapted to changing bending loads along their length from one end of the profile to the other, may have continuously decreasing cross-sections of the flange.

BRIEF DESCRIPTION OF THE DRAWINGS

Preferred embodiments of the present invention will be further explained in the following description with reference to the accompanying drawings. Therein is shown in FIG. 1 conventional constructions for wing spars, FIGS. 2 and 3 wing spars according to modes of construction which are at present conventional and FIG. 4 the upper half of a composite profile in the form of an 1-spar produced and constructed according to the invention.

DESCRIPTION OF THE PREFERRED EMBODIMENTS

Figure 1:
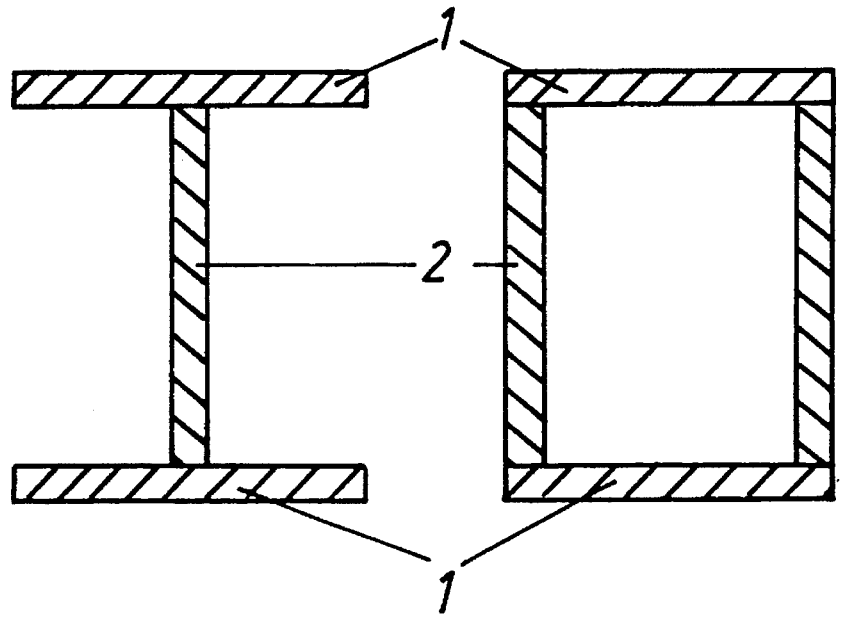

In FIG. 1 the constructions which are conventionally employed for wing spars for light aircraft are illustrated, the flanges, i.e. the portions which bear the tensile and compressive loads being denoted as 1. Webs which interconnect the flanges 1 are denoted as 2. In the I-spar illustrated on the left-hand side, two superimposed flanges 1 are interconnected by a web 2 extending essentially normal to the flanges 1 and in the centre thereof. As regards the box-spar illustrated on the right-hand side, two webs 2 are provided in the regions of the lateral edges of the flanges 1 which once again extend one above the other.

Figure 2:
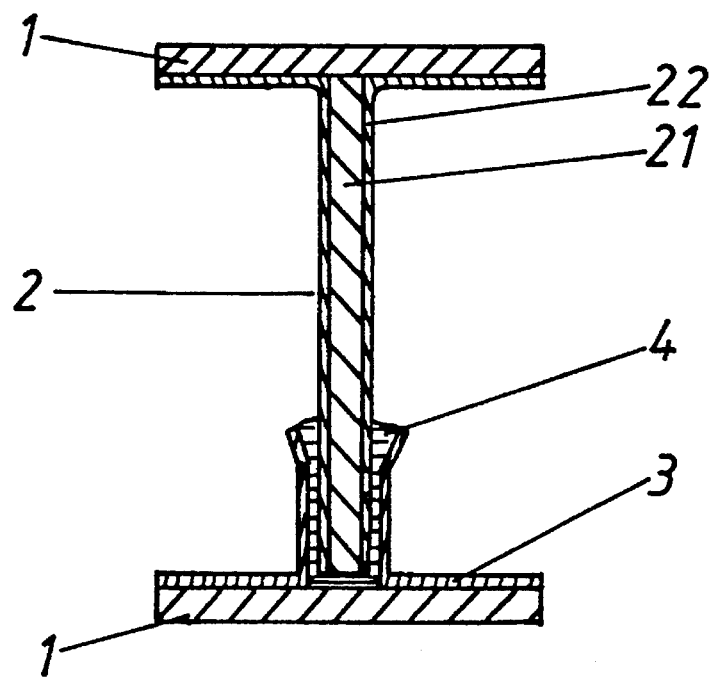

FIG. 2 illustrates an I-spar as ordinarily employed at present. The web 2 therein takes the form of a sandwich component and is composed of a web panel 21 of foam material or honeycomb material mad covering layers 22 on both sides of fibres formed into woven or non-woven fabric. As shown in the upper region of the illustrated spar, these covering .layers may simultaneously serve the purpose of connecting the web 2 to the adjoining flange 1. For that purpose the covering layers 22 are extended and comprise marginal regions 23 which proceed parallel to the flange 1 and are adhesively bonded thereto.

In the lower region another method of connection between the web 2 and the flange 1 is shown, there being applied onto the lower flange 1 special components 3 serving as adhesive bonding flange into which the lower marginal region of the web 2 as well as an adhesive 4 have been introduced, the latter providing the bonding of the components to one another.

Figure 3:
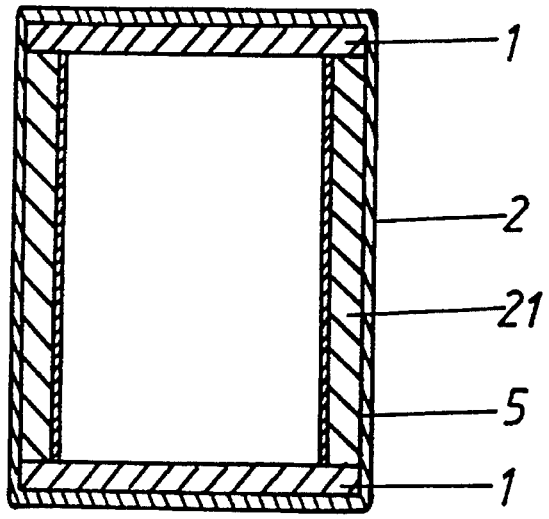

Finally, FIG. 3 shows a conventionally constructed box-spar, wherein the flanges 1 and the web panels 21 have been assembled and interconnected by the application thereto or winding there around of diagonally applied fabrics 5.

Figure 4:
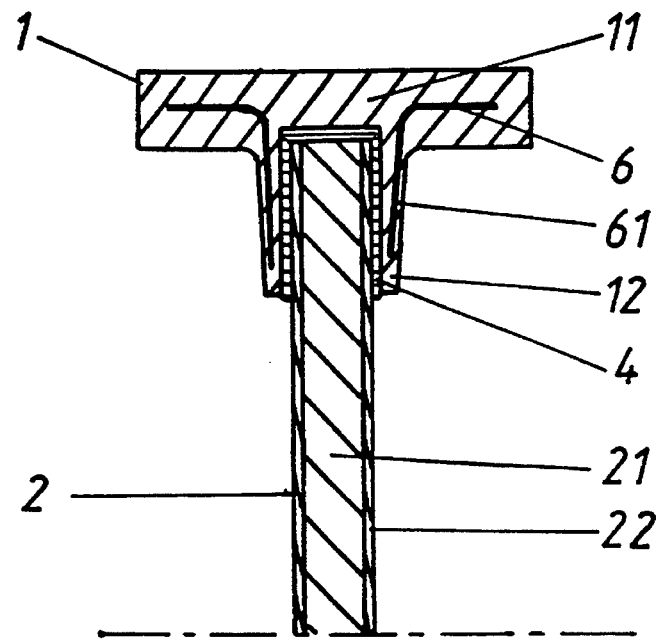

A preferred embodiment of an I-spar according to the invention is illustrated in FIG. 4. The flange 1 is manufactured by pultrusion out of rovings composed of about 100 to more than 1000 individual filaments, preferably glass fibres. Epoxy resin is used as the resin and during the pultrusion the flange 1 is produced after deformation and curing by a drawing tool as the basic structure 11 with moulded on adhesive bonded flanges 12 in the embodiment illustrated. In order to improve the thrust resistance of the adhesive bonded flanges 12, the flange 1 in addition comprises diagonal strips of woven or non-woven fabric that have been inserted and which by way of the sections 61 extend into the lateral regions of the adhesive bonded flange 12. The web 2 composed of a honeycomb or foam panel 21 and covering layers 22, preferably applied in a step-wise form composed of fibre in woven or non-woven fabrics diagonally directed, is inserted with its marginal regions between the adhesive bonding flanges 12 and is fixed therein by means of a thixotropic adhesive. This adhesive is preferably thixotropic epoxy resin.

The same steps of the pultrusion process also take place when manufacturing a single piece profile which likewise is usually advantageously constructed as an I-spar. Here as well about 100 to about 1000 individual filaments are impregnated with synthetic resin and are passed to the drawing tool by way of a pre-moulding station and a pre-curing plant, where the spar is given the desired cross-section.

Both in the manufacture of the flanges as well as the overall profile, there is preferably provided, following on to the drawing system which is provided downstream of the drawing tool, a cutting installation which preferably is moved along with the product which trims the flanges 1 or the profiles to the desired length. In the post-machining in order to modify the cross-section of the flanges the profiles simultaneously proceeds by cutting means which are likewise moved along or in a separate processing step.

In the adhesive bonding of pultruded belts and premanufactured webs, the bonding on of sandwich panels onto integrally pultruded profiles for rigidising against bulging proceeds separately in the conventional manner.

I claim:

1. Synthetic resin composite wing spar for aircraft construction comprising at least two premanufactured flanges and at least one premanufactured web interconnecting said flanges, said flanges being manufactured by pultrusion of thermoplastic resin impregnated rovings, both of said flanges being provided with adhesive bonded flanges protruding from the surface of the flanges over part of the height of the web and defining a hollow gap therebetween, said web being manufactured of cured thermoplastic resin impregnated woven or non-woven fabrics and being inserted in said hollow gap of said adhesive bonded flanges of both of the flanges of the wing spar and fixed therein by means of a thixotropic adhesive inserted into said hollow gap of the adhesive bonded flanges, further strips of woven or non-woven fabric are worked into the flanges of the wing spar and extend into the lateral protruding parts of the adhesive bonded flanges.

2. Synthetic resin composite wing spar according to claim 1, wherein said adhesive bonded flanges are formed by simultaneously moulding them onto said flanges of the wing spar during the pultrusion.

3. Synthetic resin composite wing spar according to claim 1, wherein said at least one web is composed of a base panel and cover layers provided on both sides, made of woven or knitted fabric, the number of superimposed layers of said cover layers and thereby the thickness of the web varying as a function of the longitudinal position on the web.

4. Synthetic resin composite wing spar according to claim 3, wherein the base panel is made of at least one material selected from the group consisting of foam material and honeycomb panel material.

5. Synthetic resin composite wing spar according to claim 3, wherein the number of superimposed layers of said cover layers progressively decreases from one of the narrow sides of the web to the other.

6. Synthetic resin composite wing spar according to claim 1, wherein epoxy resin is used as the adhesive and for the resin form manufacturing the flanges and at least one web of the wing spar.

7. Synthetic resin composite wing spar according to claim 1, wherein at least one resin selected from the group consisting of epoxy, polyester, vinyl and acrylic resins are used.

8. Synthetic resin composite wing spar according to claim 1, wherein at least one fibre selected from the group consisting of glass, carbon and aramide fibres are used for the rovings, woven, non-woven or knitted fabrics.

9. Synthetic resin composite wing spar according to claim 1, wherein the cross-section of the flange diminishes continuously from one end of the wing spar to the other end.

10. Synthetic resin composite wing spar according to claim 1, wherein the height of the web and thereby the height of the wing spar is continuously diminishing from one end of the wing spar to the other end, the full adhesive bonding width between the flanges and the at least one web being retained everywhere.

* * * * *